United States Patent
Yamamoto et al.

(10) Patent No.: US 7,076,883 B2
(45) Date of Patent: Jul. 18, 2006

(54) SCANNING PROBE (75) Inventors: Takeshi Yamamoto, Kawasaki (JP);
Takenori Akaike, Kawasaki (JP);
Katsuhiko Mieda, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/898,830

(22) Filed: Jul. 26, 2004

(65) Prior Publication Data
US 2005/0022409 A1    Feb. 3, 2005

(30) Foreign Application Priority Data
Jul. 28, 2003    (JP) .............................. 2003-202274

(51) Int. Cl.
*G01B 5/00*    (2006.01)
(52) U.S. Cl. .............................. 33/556; 33/558; 33/561
(58) Field of Classification Search ................. 33/556, 33/558–559, 561
See application file for complete search history.

(56) References Cited

U.S. PATENT DOCUMENTS

| | | | |
|---|---|---|---|
| 4,130,941 A * | 12/1978 | Amsbury ..................... | 33/558 |
| 4,509,263 A * | 4/1985 | Andrie et al. ................ | 33/558 |
| 4,910,446 A | 3/1990 | McMurtry et al. | |
| 5,012,591 A * | 5/1991 | Asakawa ..................... | 33/832 |
| 5,048,194 A | 9/1991 | McMurtry | |
| 5,212,873 A * | 5/1993 | McMurtry .................... | 33/559 |
| 5,966,681 A | 10/1999 | Bernhardt et al. | |
| 6,295,866 B1 * | 10/2001 | Yamamoto et al. ........... | 33/558 |
| 6,708,420 B1 * | 3/2004 | Flanagan ..................... | 33/556 |

FOREIGN PATENT DOCUMENTS

JP           8-43066        2/1996

* cited by examiner

*Primary Examiner*—Yaritza Guadalupe-McCall
(74) *Attorney, Agent, or Firm*—Rankin, Hill, Porter & Clark LLP (57) ABSTRACT

A scanning probe (1, 10) according to the present invention includes a measurement stylus (stylus) (6) movably supported via elastic members (5D, 5E, 5F) on a probe body (4), fine feeders (3, 7) for moving the probe body (4) and the measurement stylus (6) against a workpiece within a fine range, a contacting force detector (5G) for detecting a contacting force between the measurement stylus (6) and a surface of the workpiece, and a contacting force adjuster (8) for adjusting the contacting force by removing the inertial force acting to the measurement stylus (6) because of acceleration from the contacting force. Because of this feature, a measuring force can be adjusted by providing feedback controls to the fine feeders (3, 7), so that the tracking capability is ensured to provide a high response rate and high precision in measurement. Further by eliminating influence of the inertial force of the measurement stylus (6), a measurement error is corrected to obtain a correct measuring force, and high precision measurement can be executed.

4 Claims, 7 Drawing Sheets

SCANNING PROBE

BACKGROUND OF THE INVENTION

1. Field of the Invention

The present invention relates to a scanning probe. More specifically this invention relates to a scanning probe based on the contact system, which is driven along a surface of an object to be measured.

2. Description of Related Art

In a scanning probe used, for instance, in a surface texture measuring instrument for measuring roughness or waviness of a surface of an object to be measured (workpiece), it is important for improving the measuring accuracy to minimize a contacting force (measuring force) between a tip of a measurement stylus (stylus, contact needle) and a surface of a workpiece and maintain the contacting force at a constant level. There has been proposed a scanning probe, a measuring force of which can be minimized and maintained at a constant level (Refer to, for instance, Japanese Patent Laid-Open Publication No. Hei 8-43066).

The scanning probe described in the reference (a probe head of a coordinate measuring machine) includes an electromagnetic measuring force generator for generating an adjustable measuring force in each of the three orthogonal directions (X, Y, and Z directions). In this scanning probe, a measuring force can be minimized and adjusted to a desired level by loading, in response to displacement (speed) of a measurement stylus, a signal reverse to the displacement to a measuring force generator from a control circuit.

With the scanning probe described in the aforesaid reference, however, when a measuring force is minimized by controlling the measuring force generator, also a driving force for a measurement stylus is reduced, and the tracking capability of the measurement stylus to a surface of a workpiece becomes lower. To overcome this phenomenon, it is required to ensure the tracking capability of the measurement stylus by reducing the driving speed for driving the scanning probe, so that the measuring speed cannot be raised with the measuring time delayed.

Further, as a weight of a movable portion operating together with the measurement stylus is large, when a measuring force is reduced, acceleration acting over the measurement stylus when driving the scanning probe may affect the precision in measurement. Namely when the measurement stylus moves with acceleration, the inertial force defined by a product of the acceleration multiplied by a weight of the measurement stylus acts in a direction reverse to the direction in which the measurement stylus moves, and a value including this inertial force is detected as the measuring force. Therefore, the inertial force not causing any severe problem when the measuring force is large may sometimes affect a result of measurement as an error measurement and disadvantageously make it impossible to obtain the desired precision in measurement.

SUMMARY OF THE INVENTION

An object of the present invention is to provide a scanning probe, which can provide high speed response by ensuring the tracking capability thereof and also can sufficiently improve the precision in measurement.

A scanning probe according to an aspect of the present invention driven along a surface of a workpiece, includes: a probe body; a measurement stylus movably supported via elastic members on the probe body for contacting the surface of the workpiece and moving on and scanning the surface; a fine feeder for moving the probe body and the measurement stylus against the workpiece within a fine range; a contacting force detector for detecting a contacting force between the measurement stylus and the surface of the workpiece based on relative movement rates of the measurement stylus and the probe body; and a contacting force adjuster for adjusting the contacting force by subtracting an inertial force acting to the measurement stylus generated due to movement with acceleration from the contacting force, in which the fine feeder drives the probe body and the measurement stylus under feedback control so that the adjusted contacting force is within a prespecified range.

With the configuration as described above, a measuring force can be adjusted by providing feedback controls to a fine feeder so that a contacting force will be within a predefined range and also by driving the probe body and a measurement stylus with the controlled fine feeder. Because of the feature, it is possible to provide controls so that the measuring force is minimized and maintained at a constant level, and therefore the tracking capability thereof is ensured with the high speed response in measurement realized and also with the precision in measurement improved.

Further by removing an inertial force acting over the measurement stylus moving with acceleration from the contacting force with a contacting force adjuster, it is possible to correct an error in measurement, so that a correct measuring force can be obtained. Because of this feature, influence of acceleration over the precision in measurement can be eliminated, and high precision measurement including no error can be executed even with a small measuring force. Therefore, even when the scanning probe is driven, for instance, with a driving arm of a surface texture measurement instrument so that the moving speed is rapidly raised from a low level to a high level (namely, so that large acceleration acts) for carrying out high speed scanning, the high precision in measurement can be maintained.

Preferably, in the scanning probe, the fine feeder may include a three-axes slider for guiding the probe body and the measurement stylus along the three directions orthogonal to each other, and at least three actuators for moving the three-axes slider in each of the three directions.

With the configuration as described above, as the fine feeder includes a three-axes slider and an actuator, a probe body and a measurement stylus can be driven in each direction of the three axis slider by controlling the actuator by means of feed back controller. Therefore, especially when the scanning probe according to the present invention is used in a coordinate measuring machine, a measuring force in each of the three dimensional directions can be adjusted, so that the high precision in measurement can further be improved.

Preferably, in the scanning probe, the contacting force adjuster may includes: a weight having the substantially same mass as that of the measurement stylus; a pantograph mechanism for linking the weight to the measurement stylus; and a gimbal mechanism for supporting an intermediate position of the pantograph mechanism not movable against the probe body in an extending direction of the pantograph mechanism and at the same time rotatably against two shafts each orthogonal to the extending direction of the pantograph mechanism, in which the inertial force acting to the measurement stylus is balanced with the inertial force acting to the weight via the pantograph mechanism, so that the inertial force acting to the measurement stylus is removed from the contacting force.

With the configuration as described above, the contacting force adjuster includes a weight, a pantograph mechanism, and a gimbal mechanism, and when an inertial force acting to the weight is balanced with that acting to the measurement stylus, the inertial force acting to the measurement stylus is removed from the contacting force (measuring force), so that a correct contacting force can be detected by the contacting force detecting means. Therefore it is possible to eliminate the influence of an inertial force cased by acceleration and to execute high precision measurement.

Preferably, in the scanning probe, the contacting force adjuster may includes an acceleration sensor for detecting acceleration acting to the measurement stylus, and computes an inertial force acting to the measurement stylus based on the acceleration of the measurement stylus detected by the acceleration sensor, and adjusts the contacting force by subtracting the computed inertial force from the contacting force detected by the contacting force detector.

With the configuration as described above, the contacting force adjuster includes an acceleration sensor, and an inertial force acting to the measurement stylus is computed based on acceleration of the measurement stylus detected by the acceleration sensor, and also the computed inertial force is removed from the contacting force (measuring force) detected by the contacting force detector, so that a correct measuring force can be obtained. Therefore, it is possible to eliminate the influence by the inertial force caused by acceleration and to carry out high precision measurement.

DETAILED DESCRIPTION OF PREFERRED EMBODIMENT(S)

A preferable embodiment of the scanning probe according to the present invention is described below in detail with reference to the related drawings. In the following descriptions, the same reference numerals are assigned to the same components, and the descriptions thereof are omitted herefrom or simplified.

Figure 4:
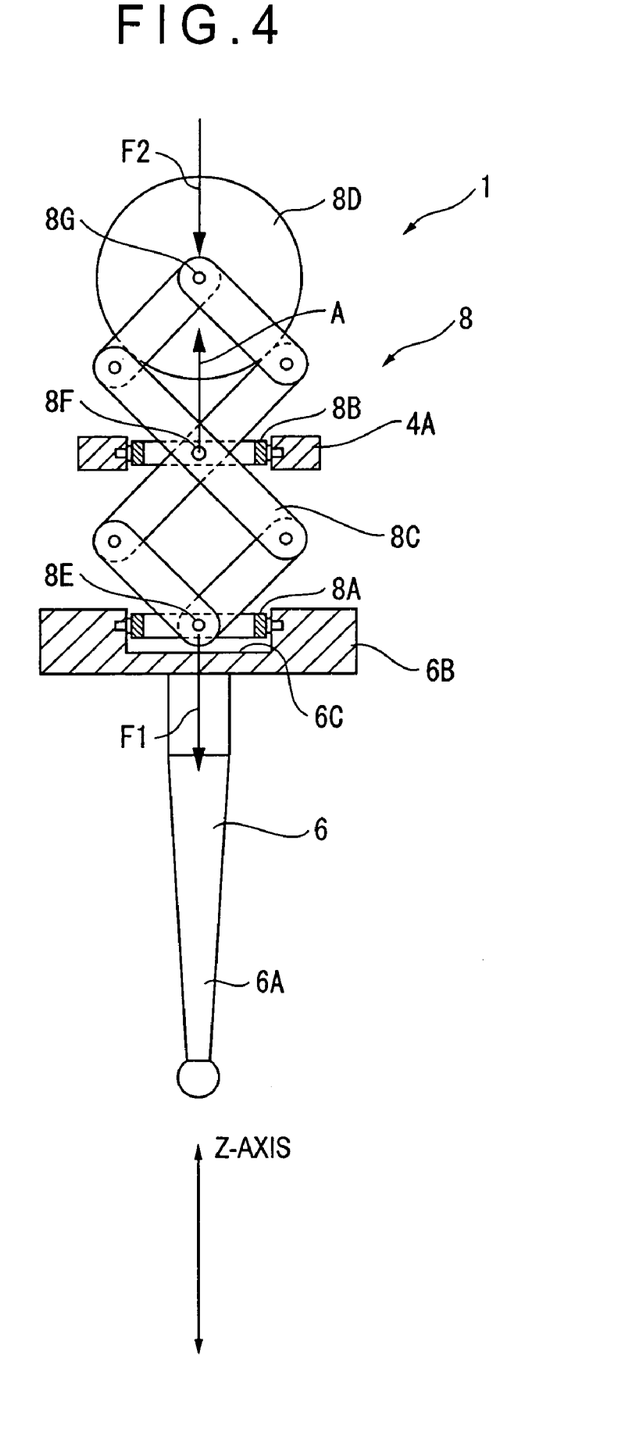
FIG. 4 is a side elevation showing illustrating operations of the contacting force adjuster provided in the scanning probe.
Figure 5:
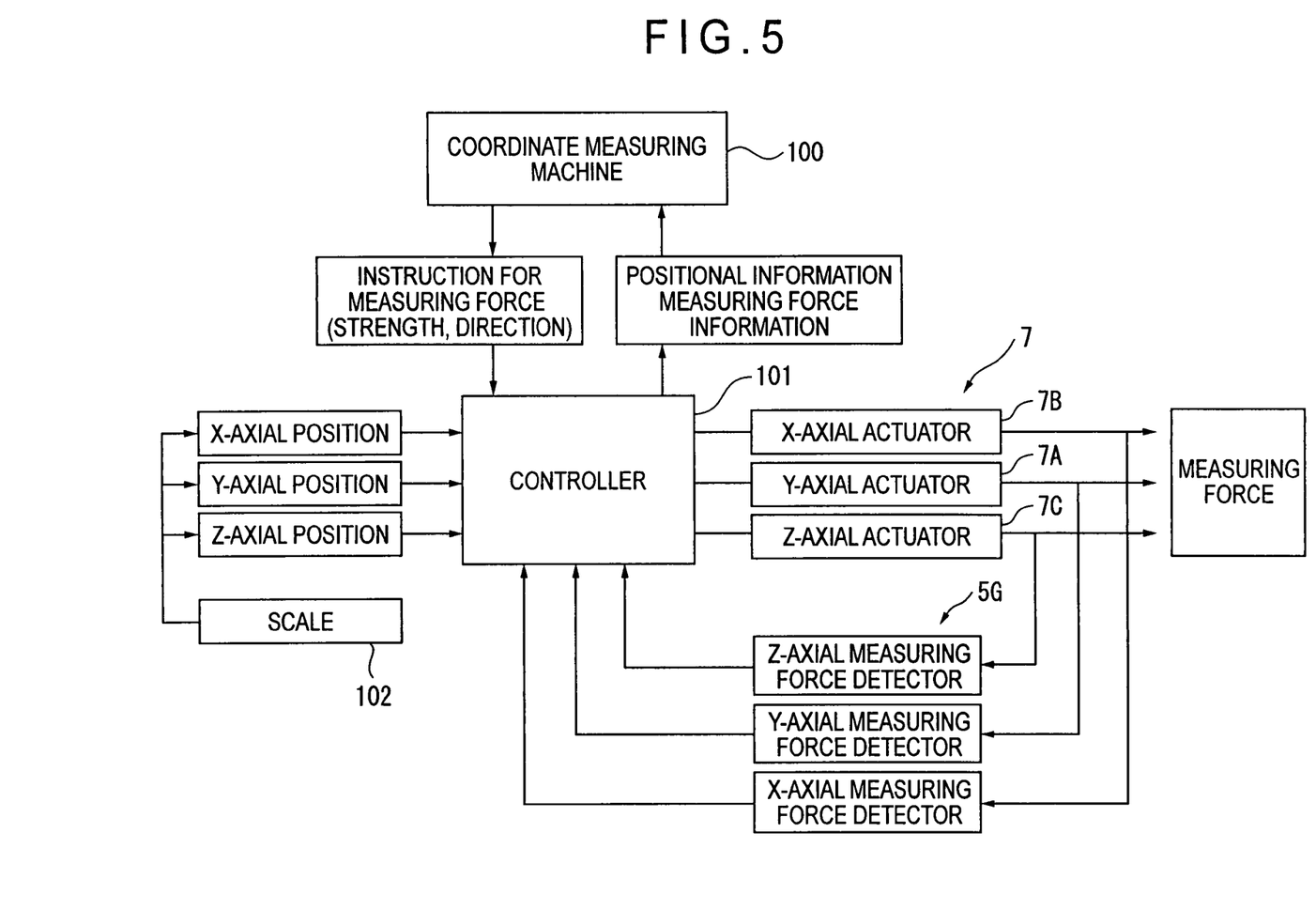
FIG. 5 is an explanatory view showing a procedure for measurement with the scanning probe.
Figure 6:
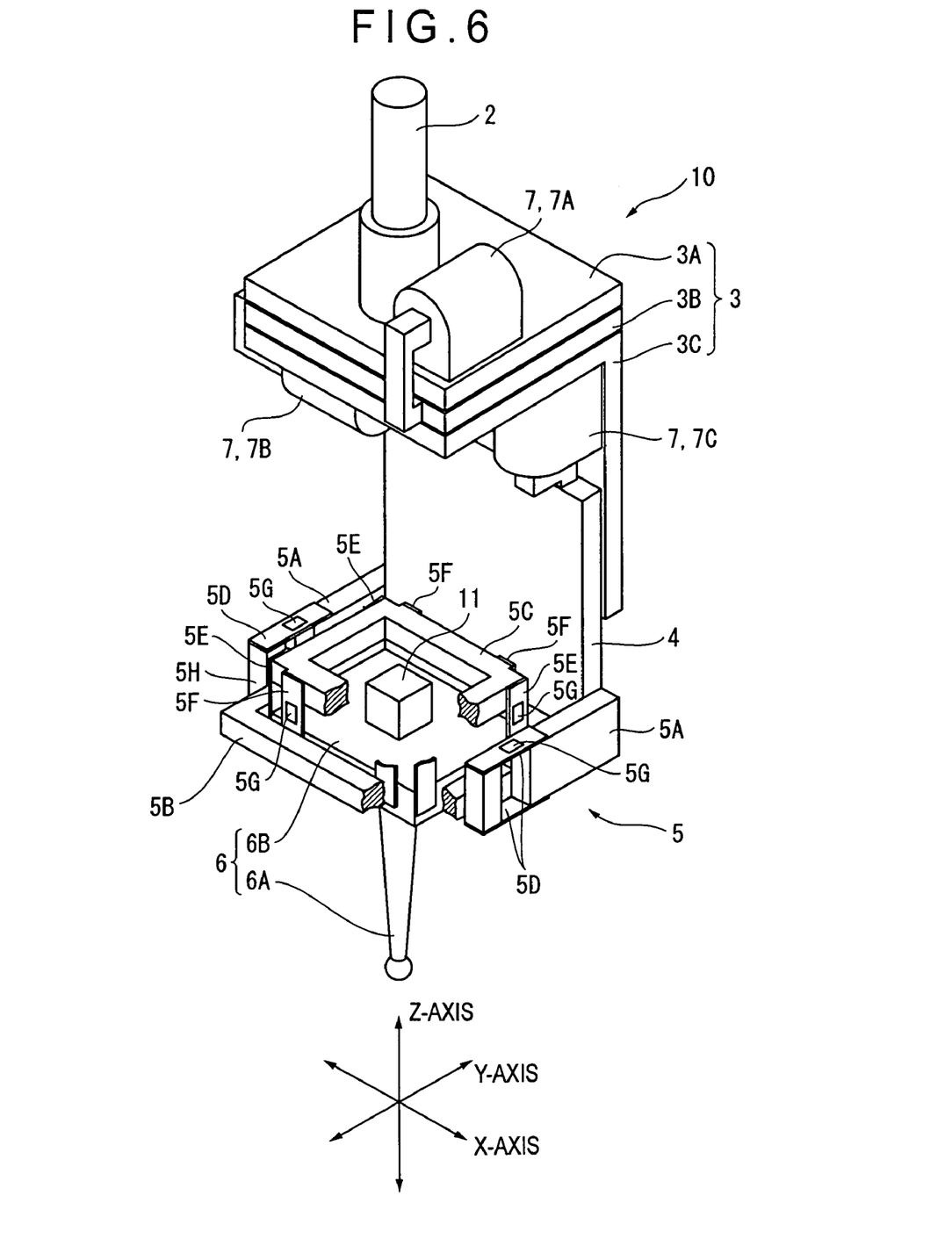
FIG. 6 is a perspective view showing a partial cross section of a scanning probe according to a second embodiment of the present invention.
Figure 7:
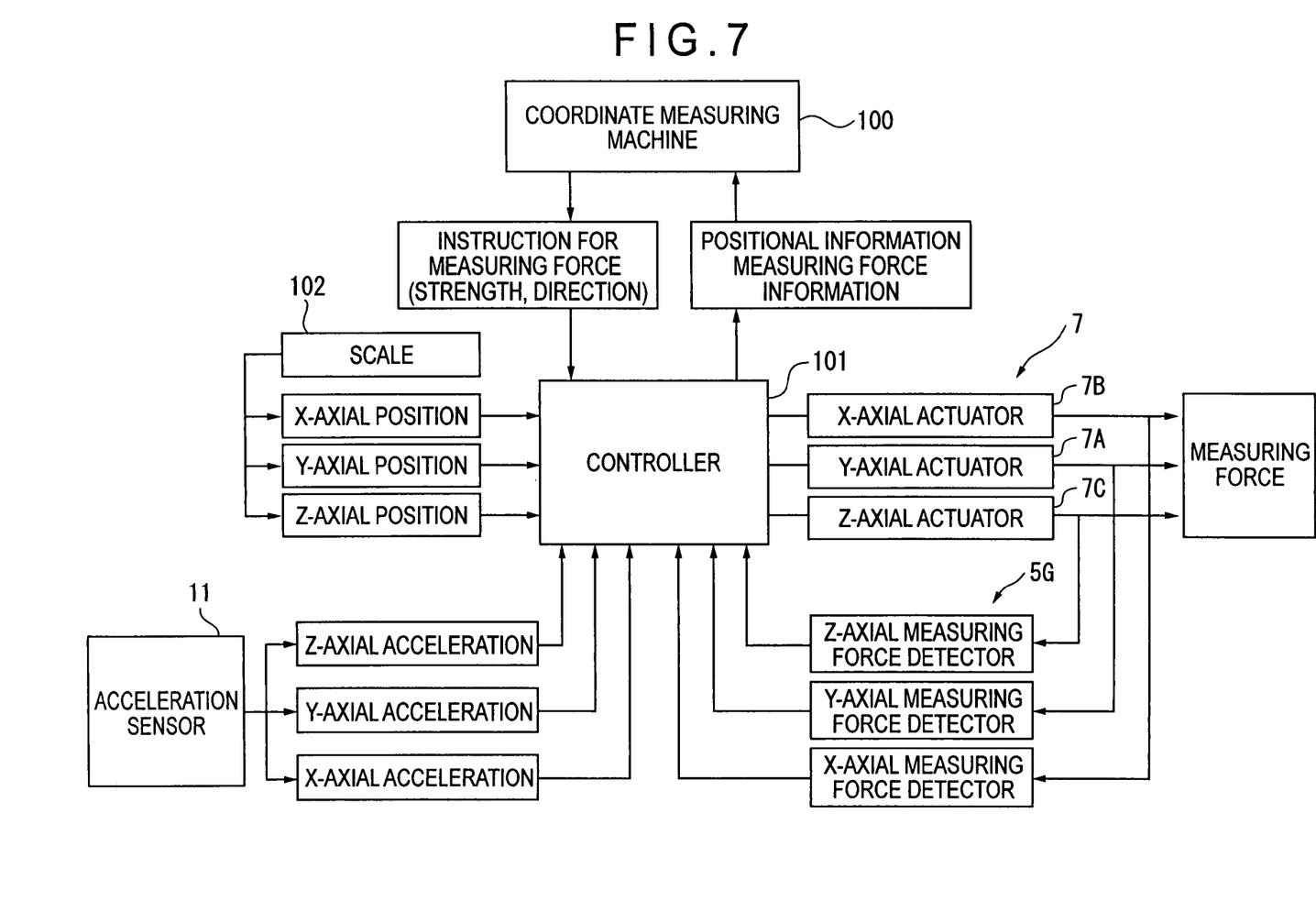
FIG. 7 is an explanatory view showing a procedure for measurement with the scanning probe.

FIGS. 1 through 5 show a first embodiment of the present invention, and FIGS. 6 and 7 show a second embodiment of the present invention.

First Embodiment

Figure 1:
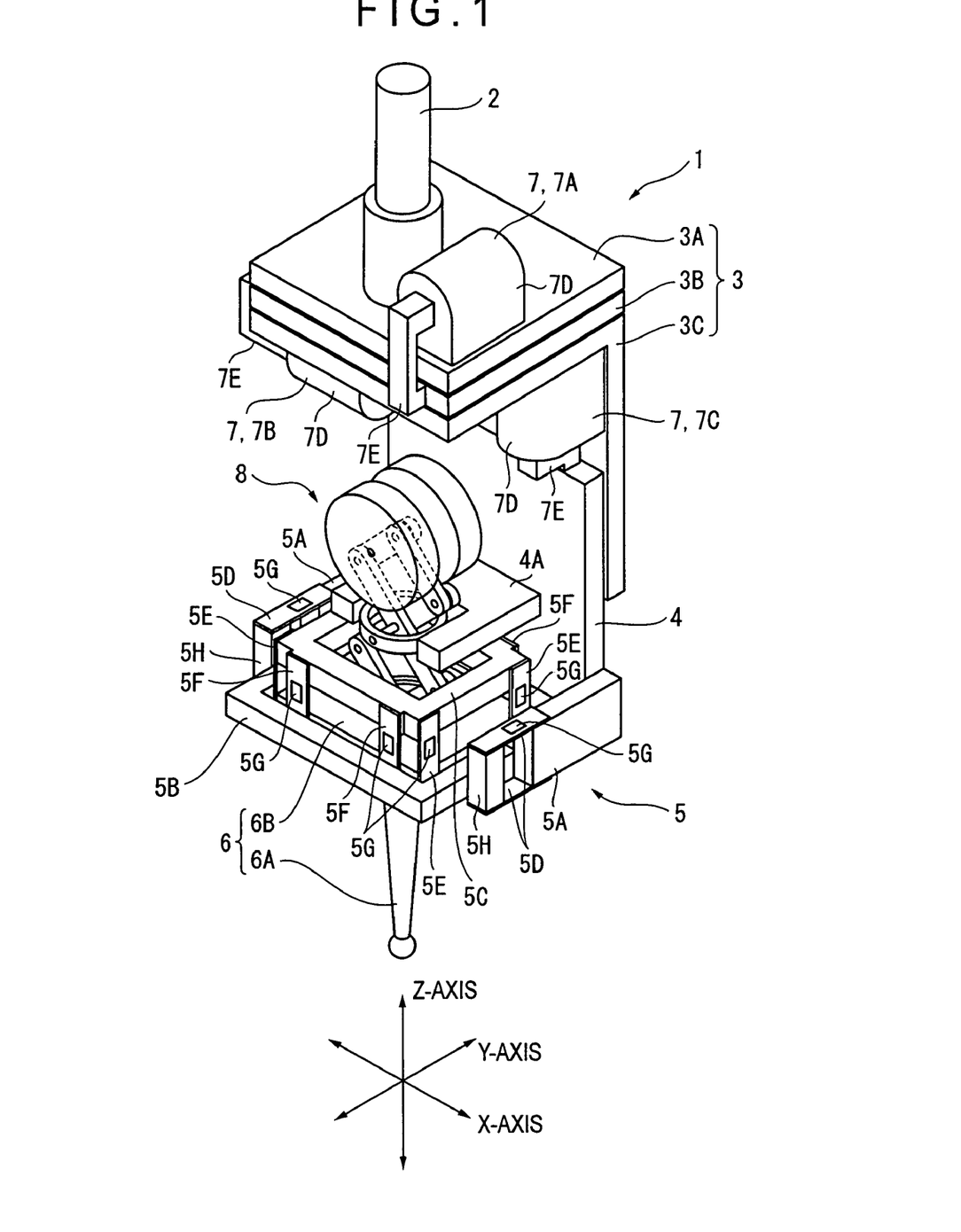
FIG. 1 is a perspective view showing a scanning probe according to a first embodiment of the present invention.
Figure 2:
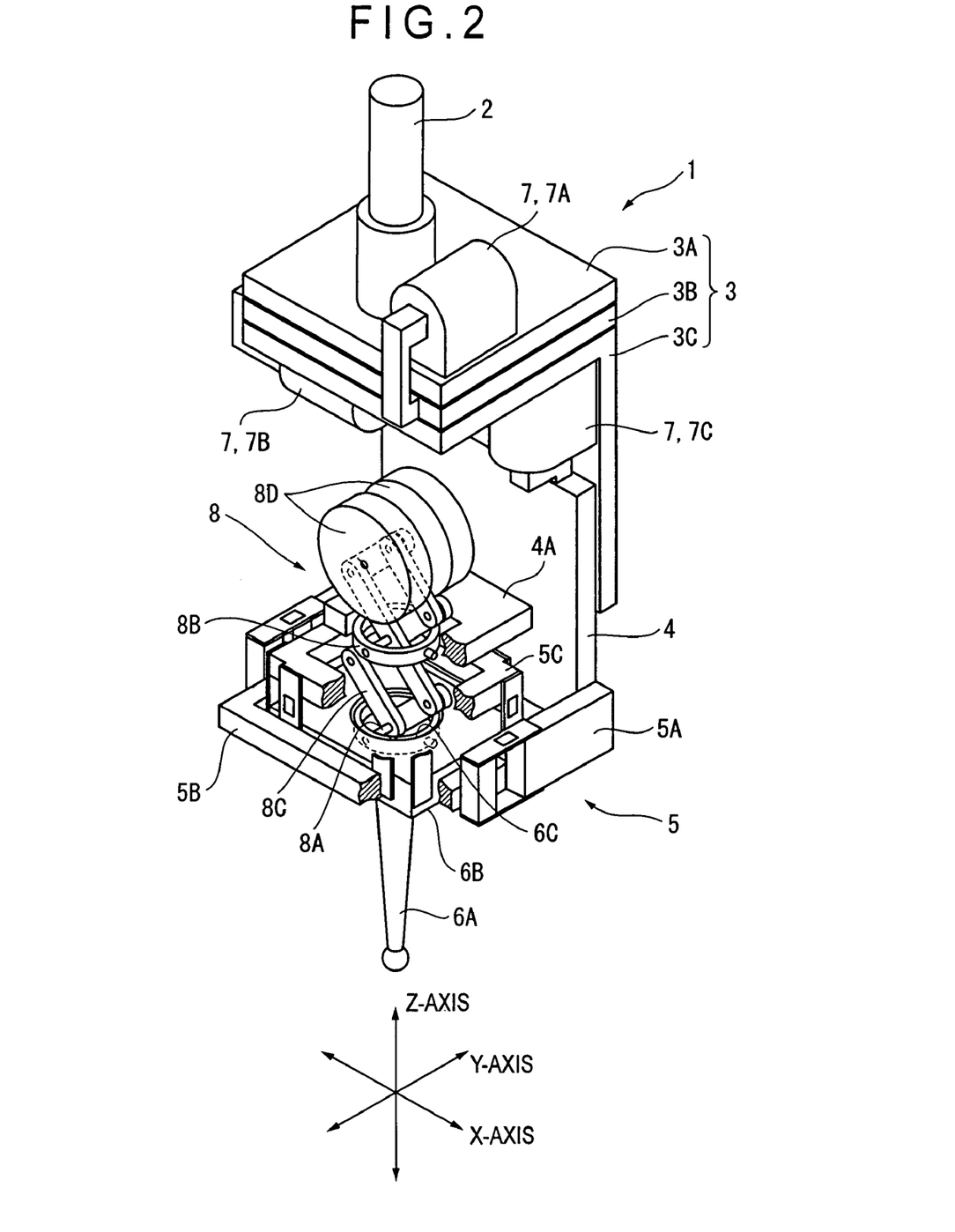
FIG. 2 is a perspective view illustrating a partial cross section of the scanning probe.
Figure 3:
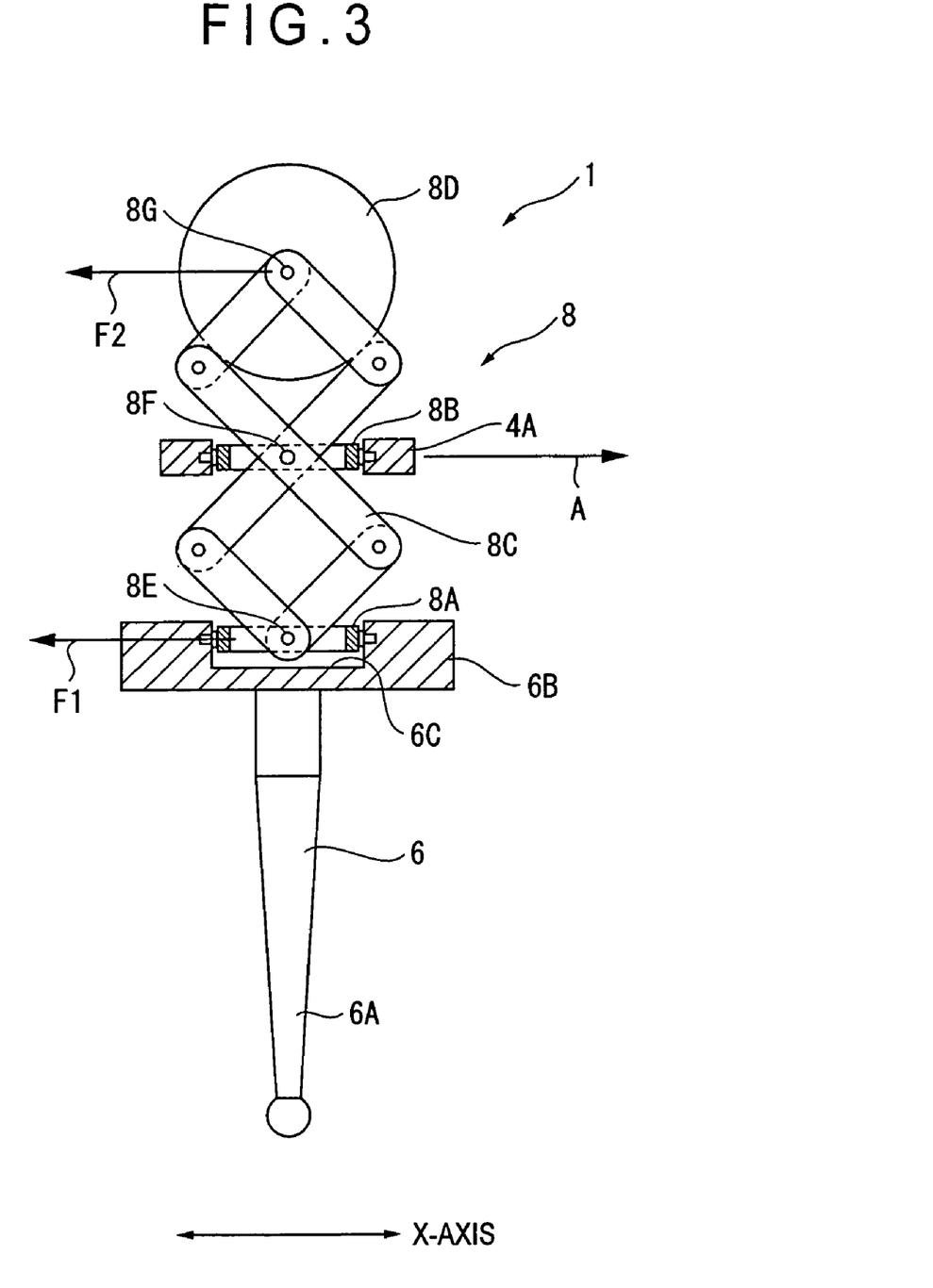
FIG. 3 is a side elevation illustrating operations of a contacting force adjuster provided in the scanning probe.

FIG. 1 is a perspective view showing a scanning probe 1 according to a first embodiment. FIG. 2 is a perspective view showing a partial cross section of the scanning probe 1. FIG. 3 and FIG. 4 are side elevations illustrating operations of a contacting force adjuster provided in the scanning probe 1.

FIG. 5 is an explanatory view showing a procedure of measurement with the scanning probe 1.

In FIG. 1, the scanning probe 1 includes a mounting shaft 2 mounted on a driving arm of a coordinate measuring machine not shown in the figures, and is driven in each of the three directions (X, Y, and Z directions) perpendicular to each other in association with movement of the driving arm. Namely the scanning probe 1 in FIG. 1 is a three-dimensional scanning probe based on the contact system which is driven in two horizontal directions (X and Y directions) along a surface of an object to be measured (workpiece) not shown in the figures and placed below the scanning probe 1 and in the vertical direction (direction Z).

The scanning probe 1 includes a three-axes slider 3 fixed to a lower edge of the mounting shaft 2, a probe body 4 provided under the three-axes slider 3, a parallel link mechanism 5 linked to the probe body 4, and a stylus 6 as a measurement stylus supported by the parallel link mechanism 5. This stylus 6 includes a contact needle 6A and a stylus mounting section 6B, and a tip of the contact needle 6A contacts a surface of a workpiece and moves as scanning a surface of the workpiece.

The three-axes slider 3 includes first to third slide members 3A, 3B, and 3C. The first slide member 3A is formed with a plate member which is fixed to a lower edge of the mounting shaft 2 and is in parallel to the X-Y plane (a flat plane parallel to the X-axis and Y-axis, horizontal plane). Provided on a bottom surface (a surface in the opposite side from the mounting shaft 2) of the first slide member 3A is a guide (not shown) parallel to the Y-axis. The second slide member 3B is formed with a plate member parallel to the X-Y plane and is slidably supported so that the slide member 3B can move in the Y direction against the first slide member 3A when guided by the guide on the bottom surface of the first slide member 3A. A guide (not shown) parallel to the X-axis is provided on a bottom surface of the second slide member 3B. The third slide member 3C is formed with a plate member parallel to the X-Y plane and another plate member parallel to the X-Z plane (vertical plane), and has the general form looking like the character of L. The third slide member 3C is slidably supported so that the slide member 3C can move in the X direction against the second slide member 3B when guided by the guide on the bottom surface of the second slide member 3B. Provided on the vertical surface of the third slide member 3C is a guide (not shown) parallel to the Z-axis, and being guided by this guide, the probe body 4 is slidably supported in the Z direction against the third slide member 3C.

Actuators 7 (7A, 7B, 7C) are provided in the first to third slide members 3A, 3B, and 3C respectively. The actuator 7 provided on a top surface of the first slide member 3A is the Y-axial actuator 7A for moving the second slide member 3B in the Y direction against the first slide member 3A. The actuator 7 provided on a horizontal surface of the third slide member 3C is the X-axial actuator 7B for moving the third slide member 3C in the X direction against the second slide member 3B. The actuator 7 provided on a vertical surface of he third slide member 3C is the Z-axial actuator 7C for moving the probe body 4 in the Z direction against the third slide member 3C.

Each of the actuators 7A, 7B, and 7C includes a body section 7D incorporating therein a driving mechanism such as a linear motor including a permanent magnet or a movable coil, a rotary motor, a piezoelectric element or the like, and an arm section 7E protruding from the body section 7D, and is connected with a cable or the like (not shown) to a controller 101 (FIG. 5) for the coordinate measuring machine 100 (FIG. 5). In the Y-axial actuator 7A, the body section 7D is fixed to a top surface of the first slide member 3A, and the arm section 7E protrudes therefrom in the Y direction and is linked to a side surface of the second slide member 3B. In the X-axial actuator 7B, the body section 7D is fixed to a bottom surface of the third slide member 3C, and the arm section 7E protrudes therefrom in the X direction and is linked to a side surface of the second slide member 3B. In the Z-axial actuator 7C, the body section 7D is fixed to a vertical surface of the third slide member 3C, and the arm section 7E protrudes therefrom in the Z direction and is linked to a top edge of the probe body 4.

When a control signal is issued from the controller to each of the actuators 7A, 7B, and 7C, the driving mechanism of the body section 7D starts operating, so that the arm section 7E is driven for moving forward or backward, and the second and third slide members 3B, 3C and the probe body 4 are driven in each of the three-axial directions (X, Y, and Z directions). Thus the second and third slide members 3B, 3C and the probe body 4 can be moved within a very small range by providing controls for driving each of the actuators 7A, 7B, and 7C. As described above, the fine feeder includes the actuator 7 in turn including the three-axes slider 3 provided with the first to third slide members 3A, 3B, and 3C, and the actuator 7 including three actuators 7A, 7B, and 7C for driving in the axial directions Y, X, and Z.

Although not shown in the figures, provided in the three-axes slider 3 is a scale 102 (FIG. 5) for detecting positions of the slide members 3A, 3B, 3C and the probe body 4 in the X, Y, and Z directions, and the positional information detected by this scale 102 is sent to the controller 101.

The probe body 4 is formed with a plate member parallel to the X-Z plane (vertical surface), and the parallel link mechanism 5 is fixed to a bottom section of the probe body 4.

The parallel link mechanism 5 includes two first link members 5A extending in parallel to the Y-axis from two sides of the bottom of the probe body 4, a second link member 5B having a form like a square ring and supported between the first link members 5A, and a third link member 5C having a form like a square ring and supported above this second link member 5B. The stylus 6 is supported under this third link member 5C. The link members 5A, 5B, 5C, and the stylus 6 are linked to each other via a plate spring 5D which is an elastic member, and the stylus 6 is supported so that it can freely move in the three-dimensional directions (X, Y, and Z directions) against the first link member 5A, namely against the probe body 4.

A base section of the first link member 5A is fixed to the probe body 4. A pair of plate springs 5D vertically opposite to each other and parallel to the X-Y plane are attached to a tip portion of the first link member 5A. Further the second link member 5B is fixed to a linking member 5H linking tips of the pair of plate springs 5D to each other. Namely, the second link member 5B is supported via the four sheets of plate springs 5D by the first link member 5A. Each of the plate springs 5D can deform in the Z direction which corresponds to the thickness direction of the plate spring 5D, and when the top and bottom plate springs 5D deform preserving the parallelism, the second link member 5B can move in the Z direction preserving the parallel position to the X-Y plane against the first link member 5A.

Of the four edges forming a square ring of the second link member 5B, the two edges extending in the Y direction have a pair of plate springs 5E provided in the inner sides from the edges and extending upward in parallel to the Y-Z plane respectively. Further, outer sides of the two edges of the third link member 5C extending along the Y-axis are fixed to top edges of these four plate springs 5E. Namely, the third link member 5C is supported via the four plate springs 5E by the second link member 5B. The plate spring 5E can deform in the X direction which corresponds to the thickness direction thereof, and when the four plate springs 5E deform preserving the parallelism, the third link member 5C can move preserving the parallel position to the X-Y plane in the X direction against the second link member 5B.

Of the four edges of a square ring of the third link member 5C, the two edges have a pair of plate springs 5F provided in the outer sides thereof along the X-axis and extending downward in parallel to the X-Z plane respectively. Side edges of the stylus 6 along the X-axis of the stylus mounting section 6B are fixed to bottom edges of these four plate springs 5F. Namely the stylus 6 is supported via the four plate springs 5F to the third link member 5C. Further the plate springs 5F can deform in the Y direction which corresponds to the thickness direction thereof, and when the four plate springs 5F deform preserving the parallelism, the stylus 6 can move in the Y direction against the third link member 5C preserving the parallel position to the X-Y plane.

Attached to the plate springs 5D, 5E, and 5F are distortion gauges 5G for detecting deformation (distortion) of the plate springs 5D, 5E, and 5F respectively. These distortion gauges 5G are connected via a cable or the like not shown to a controller 101 (FIG. 5) of the coordinate measuring machine 100 (FIG. 5), and detected values for deformation (distortion) of the plate springs 5D, 5E, and 5F are sent as data to the controller 101, and a contacting force (measuring force) between the contact needle 6A of the stylus 6 and a workpiece is detected from the data. Namely the contacting force detector includes the distortion gauges 5G.

The contacting force detector is not limited to the distortion gauge 5G and any tool may be used as the distortion gauge 5G so long as a contacting force acting to the stylus 6 can be detected.

The stylus mounting section 6B is provided inside the square ring of the second link member 5B, namely at the substantially same position in the Z direction, and at the same time has a prespecified clearance against an inner side face of the second link member 5B. Because of this clearance, the stylus 6 does not strike the inner side face of the second link member 5B even when the stylus 6 moves in the Y direction against the third link member 5C and the third link member 5C moves in the X direction against the second link member 5B.

In FIG. 2, provided above the stylus mounting section 6B is a contacting force adjuster 8 according to this embodiment. Namely a recess 6C which is circular when viewed from the top is formed on a top surface of the stylus mounting section 6B (a surface opposite to the contact needle 6A), and a first gimbal mechanism 8A is provided in this recess 6C. Further a support member 4A having a substantially square horse shoe form when viewed from the top and protruding in the Y direction is fixed onto the inner side face of the probe body 4, and a second gimbal mechanism 8B is provided in an opening of the support member 4A, the opening having a form like a square horseshoe. These two gimbal mechanisms 8A and 8B support a pantograph mechanism 8C capable of extending and shrinking in the vertical direction (Z direction), and a counter balance 8D as a weight is attached to a top edge of the pantograph mechanism 8C. As described above, the contacting force adjuster 8 includes the gimbal mechanisms 8A, 8B, pantograph mechanism 8C, and the counter balance 8D.

The gimbal mechanisms 8A, 8B include rings supported rotatably around the X-axis in the recess 6C of the stylus mounting section 6B and on the inner surface of the support member 4A, and rotation shafts 8E, 8F respectively attached to the rings in parallel to the Y-axis as shown in FIG. 3 and FIG. 4. A lower edge and an intermediate position of the pantograph mechanism 8C are borne by these two rotation shafts 8E and 8F. Namely the pantograph mechanism 8C is supported so that it can rotate around the X-axis and the Y-axis against the stylus mounting section 6B and the support member 4A via the gimbal mechanisms 8A, 8B respectively but can not rotate around the Z-axis, and also so that it can not move in any of the three axial directions of X, Y, and Z.

The pantograph mechanism 8C includes 6 links provided in parallel to the X-Z plane respectively and connected to each other so that it can rotate around the Y-axis, and can extend and shrink in the Z direction. Namely, edges of the two lower links are linked to the rotation shaft 8E, edges of other intermediate links are linked to other edges of the two lower links with the middle positions of the intermediate links connected to each other at the rotation shaft 8F, other edges of the intermediate links are connected to edges of two upper links respectively, and other edges of these two upper links are connected to each other on a coupling shaft 8G. This coupling shaft 8G is provided on a linear line along the Z-axis on which also the rotation shafts 8E and 8F are present, and also at a symmetrical position against the rotation shaft 8E with the rotation shaft 8F therebetween. Then, the counter balance 8D having the substantially same weight as the stylus 6, or a total of weights of the contact needle 6A and the stylus mounting section 6B is attached to this coupling shaft 8G.

Next a procedure of measuring a surface texture of a workpiece with the scanning probe 1 according to this embodiment is described below with reference to FIG. 3 to FIG. 5.

In FIG. 3, the scanning probe 1 is moving with acceleration A in the X direction toward the right side in the figure. As for the movement with acceleration A, for instance, the scanning probe 1 is driven so that it accelerates in the rightward direction. Or the scanning probe 1 is driven so that it decelerates during movement in the leftward direction. When rightward acceleration A acts to the scanning probe 1, an inertial force F1 which is equal to a product of the weight multiplied by acceleration A acts to the stylus 6 in the leftward direction, and also an inertial force F2 acts to the counter balance 8D in the leftward direction likely. As a weight of the stylus 6 is almost the same as that of the counter balance 8D, strengths of the inertial forces F1, F2 are substantially identical. Therefore the inertial forces F1 and F2 are balanced at a position of the rotation shaft 8F between the stylus 6 and the counter balance 8D coupled to each other with the pantograph mechanism 8C, and the inertial forces F1, F2 are delivered via the gimbal mechanism 8B and the support member 4A as counter forces to the probe body 4. Because of this configuration, the inertial force F1 acting to the stylus 6 is not detected by the distortion gauge 5G of the parallel link mechanism 5, so that a correct measuring force caused by contact of the contact needle 6A of the stylus 6 to the workpiece is detected.

It is to be noted that, also when acceleration acts leftward in the X direction or in the Y direction, a correct measuring force generated by contact of the contact needle 6A of the stylus 6 to the workpiece can be detected as described above.

In FIG. 4, the scanning probe 1 is moving with acceleration A upward in the Z direction in the figure. When the upward acceleration A acts to the scanning probe 1, the inertial forces F1 and F2 each having the substantially same strength act downward to the stylus 6 and to the counter balance 8D. The inertial force F1 is a force for extending the pantograph mechanism 8C in the vertical direction, while the inertial force F2 is a force for shrinking the pantograph mechanism 8C in the vertical direction, and therefore the two inertial forces are balanced. Because of this configuration, the inertial force F1 acting to the stylus 6 is not detected by the distortion gauge 5G of the parallel link mechanism 5, and a correct measuring force generated by contact of the contact needle 6A of the stylus 6 to the workpiece is detected by the distortion gauge 5G.

The coordinate measuring machine 100 instructs the controller 101 to issue an instruction for a measuring force as shown in FIG. 5. The controller 101 receives an instruction value (an instruction for a measuring force including the strength and direction), positional information in the X, Y, and Z directions from the scale 102 provided on the three-axes slider 3, and a correct measuring force detected by the distortion gauges 5G (X, Y and Z-axial measuring force detectors), and controls the actuators 7B, 7A, 7C for movement in the three-axial directions X, Y, and Z based on the data. Namely the actuator 7 is controlled by the controller 101 by means of feedback control so that a difference between a correct measuring force detected by the distortion gauges 5G and a measuring force instructed by the coordinate measuring machine 100 is minimized. Measurement of a surface texture of a workpiece by the coordinate measuring machine 100 is carried out based on the measuring force and positional information obtained as described above.

With the embodiment described above, the following advantages are provided.

(1) It is possible to adjust a measuring force to a value within a prespecified range by providing feedback controls to the actuator 7 based on an instruction value from the coordinate measuring machine 100 to move the probe body 4 and the stylus 6 by this controlled actuator 7 within a fine range. Therefore controls can be provided so that the measuring force is minimized and maintained at a constant level, so that the capability of the stylus 6 for tracking a workpiece is ensured and the measurement can be performed with a higher response rate and further improved precision.

(2) When the scanning probe 1 moves with acceleration A, the inertial force F1 acting to the stylus 6 is balanced with the inertial force F2 acting to the counter balance 8D of the contacting force adjuster 8 and the inertial force F1 acting to the stylus 6 is removed from the contacting force, so that a measurement error caused by the inertial force F1 is eliminated and a correct measuring force can be obtained. Because of the feature as described above, influence of acceleration A over precision in measurement is eliminated and high precision measurement not including a measurement error can be carried out even with a small measuring force. Therefore even when high speed scanning measurement is carried out by driving the scanning probe 1 rapidly changing the operating speed from a low speed to a high speed (so that large acceleration will act), high measurement precision can be maintained.

(3) As the fine feeder includes the three-axes slider 3 and the actuator 7, the probe body 4 and the stylus 6 can be driven in the driving directions allowable with the three-axis slier 3 by controlling the actuator 7 by means of feedback control. Therefore, a measuring force detected by the scanning probe 1 can be adjusted in each of the three-dimensional directions, so that the measurement precision can further be improved.

(4) The parallel link mechanism 5 supporting the stylus 6 includes the first to third link members 5A, 5B, 5C linked to each other via the plate spring 5D, and the first link member 5A, the second link member 5B, and the stylus mounting section 6B for the stylus 6 are provided at the substantially same positions in the Z-axial direction, so that the scanning probe 1 can be built with a compact form adapted especially for measurement in the Z direction.

Second Embodiment

FIG. 6 is a perspective view showing a partial cross section of a scanning probe 10 according to a second embodiment. FIG. 7 is an explanatory view showing a procedure of measuring with the scanning probe 10. In the scanning probe 10 according to the second embodiment, configuration of the contacting force adjuster is different from that in the first embodiment described above. Other portions of the configuration are almost the same as those in the first embodiment.

In FIG. 6, an acceleration sensor (accelerometer) 11 is provided on a top surface of the stylus mounting section 6B of the stylus 6. The acceleration sensor 11 is a three-axis acceleration sensor capable of detecting acceleration in each of the three axial directions along the X, Y and Z-axes, so that acceleration in the X, Y, Z directions acting to the stylus 6 can be detected respectively. The acceleration sensor 11 is connected with a cable or the like not shown to the controller 101 (FIG. 7) of the coordinate measuring machine 100 (FIG. 7), and the detected acceleration is sent as data to the controller 101.

In FIG. 7, data for acceleration sent from the acceleration sensor 11 is processed by the controller 101. Namely the inertial force acting to the stylus 6 is computed by multiplying the detected acceleration by a weight of the stylus 6, and the computed inertial force is subtracted from the measuring force detected by the distortion gauges 5G (X, Y, Z-axial measuring force detectors). By this operation, a correct measuring force generated by contact of the contact needle 6A of the stylus 6 to a workpiece can be detected. For this purpose, a contacting force adjuster according to this embodiment includes the acceleration sensor 11 and a computing unit for processing the acceleration detected by the acceleration sensor 11.

The controller 101 controls the actuators 7B, 7A, 7C for movements in the X, Y, and Z directions based on an instruction value from the coordinate measuring machine 100, positional information for the X, Y, Z directions provided from the scale 102 of the three-axes slider 3, and the computed correct measuring force. Namely feedback controls for the actuator 7 is provided by the controller 101 so that a difference between the computed correct measuring force and the measuring force instructed by the coordinate measuring machine 100 is minimized. Based on the measuring force and the positional information obtained as described above, measurement of a surface texture of a workpiece is carried out by the coordinate measuring machine 100.

With the embodiment as described above, the following advantages are provided in addition to the substantially same advantages as those described in (1), (3), and (4) above.

(5) By employing the configuration in which the contacting force adjuster includes the acceleration sensor 11, and also by computing an inertial force acting to the stylus 6 based on the acceleration of the stylus 6 detected by the acceleration sensor 11 and subtracting the detected inertial force from the contacting force (measuring force) detected by the distortion gauges 5G, a correct measuring force can be obtained. Therefore, it is possible to carry out accurate and high precision measurement by eliminating the influence by an inertial force caused by acceleration.

(6) The contacting force adjuster can easily be built, so that a structure of the scanning probe 10 can be simplified and reduction in the size as well as in the weight can be achieved.

The scanning probe according to the present invention is not limited to the embodiments described above, and various changes and modifications are possible without departing from the gist of the present invention.

For instance, in the embodiments described above, a three-dimensional probe used in a coordinate measuring machine as the scanning probe 1 or 10 was described, but the present invention is not limited to this configuration, and the scanning probe may have the configuration in which the stylus can move in one-dimensional direction, or in two-dimensional directions. Any alternative configuration of the scanning probe is allowable on the condition that also the contacting force detector, contacting force adjuster, fine feeder and other devices can detect a measuring force in the direction in which the stylus moves, influence of the inertial force acting in the direction can be eliminated, and fine adjustment of the stylus in the direction is possible.

In the embodiments described above, the fine feeder includes the three-axes slider 3 and the actuator 7, but the fine feeder may include a different driving mechanism. For instance, the configuration is allowable in which movement in any of the X, Y, and Z directions is impossible, namely in which the fine feeder has a freedom of movement only in one or two axial directions. In other words, even when detection of a measuring force with the stylus is carried out in the three axial directions, driving of the fine feeder may be omitted in a direction in which fine feed by feedback controls is not required because of practical reasons such as precision and a speed required in the measurement.

Further the mechanism for supporting the stylus 6 on the probe body 4 is not limited to the parallel link mechanism 5, and any mechanism having the same action may be employed. Further the elastic members are not limited to the plate springs 5D, 5E, and 5F, and a combination of a slider and a coil spring may be employed, and other configuration may be employed. In the embodiments described above, the distortion gauge 5G (contacting force adjuster) is attached to each of the plate springs 5D, 5E, and 5F, but a position for attaching the contacting force adjuster is not limited to any specific position so long as a contacting force between a stylus and a workpiece can be detected.

In the first embodiment described above, the contacting force adjuster 8 includes the pantograph mechanism 8C or the gimbal mechanisms 8A, 8B, but the present invention is not limited to this configuration, and other link mechanism providing the same action may be employed. Further, when adjustment of a contacting force, for instance, in the Z direction is not required for practical reasons, the configuration may be employed in which the stylus and the counter balance are linked with a rod or the like and a central position of the rod member in the extending direction is supported rotatably around the two axes (X-axis and Y-axis), since a mechanism capable of extending and shrinking in the two directions is not necessary.

What is claimed is:

1. A scanning probe driven along a surface of a workpiece, comprising:
 a probe body;
 a measurement stylus movably supported via elastic members on the probe body for contacting the surface of the workpiece and moving on and scanning the surface;
 a fine feeder for moving the probe body and the measurement stylus supported thereon such that said measurement stylus moves against the workpiece within a fine range;
 a contacting force detector for detecting a contacting force between the measurement stylus and the surface of the workpiece based on relative movement rates of the measurement stylus and the probe body; and
 a contacting force adjuster for adjusting the contacting force by subtracting an inertial force acting to the measurement stylus generated due to movement with acceleration from the contacting force, wherein the contacting force adjuster comprises:
  a weight having a mass that is substantially identical to a mass of the measurement stylus; and,
  a linking member for linking the measurement stylus and the weight, the linking member having a central portion being supported rotatably around two axes orthogonal to an extending direction of the linking member,
 wherein the fine feeder drives the probe body and the measurement stylus under feedback control so that the adjusted contacting force is within a prespecified range.

2. The scanning probe according to claim 1, wherein the fine feeder includes a three-axes slider for guiding the probe body and the measurement stylus along three directions orthogonal to each other, and at least three actuators for moving the three-axes slider in each of the three directions.

3. The scanning probe according to claim 1, wherein the
 linking member is a pantograph mechanism for linking the weight to the measurement stylus; and,
 the contacting force adjuster comprises a gimbal mechanism for supporting an intermediate position of the pantograph mechanism not movable against the probe body in an extending direction of the pantograph mechanism and at the same time rotatably movable against two shafts each orthogonal to the extending direction of the pantograph mechanism,
 wherein an inertial force acting on the measurement stylus is balanced by an inertial force acting on the weight via the pantograph mechanism, so that the inertial force acting on the measurement stylus does not contribute to the contacting force.

4. The scanning probe according to claim 1, wherein the contacting force adjuster includes an acceleration sensor for detecting acceleration acting to the measurement stylus, and computes an inertial force acting to the measurement stylus based on the acceleration of the measurement stylus detected by the acceleration sensor, and adjusts the contacting force by subtracting the computed inertial force from the contacting force detected by the contacting force detector.

* * * * *